June 19, 1923.

L. M. ALLEN

CONTROLLING SYSTEM

Filed Nov. 25, 1919

Inventor:
Louis M. Allen.

by C. P. Sofer

Att'y

June 19, 1923.

L. M. ALLEN

CONTROLLING SYSTEM

Filed Nov. 25, 1919

Inventor:
Louis M. Allen.
by C. P. Soper Att'y

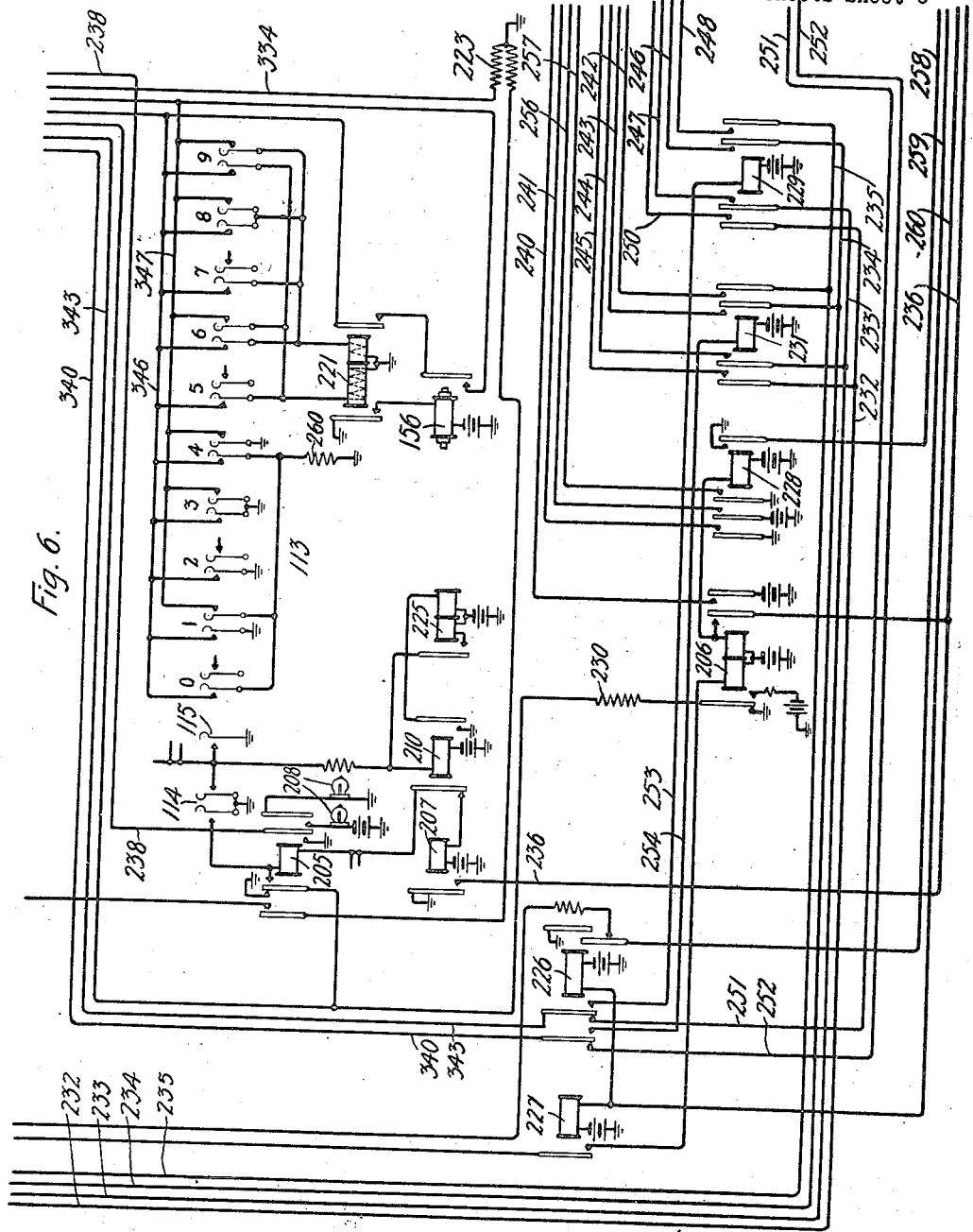

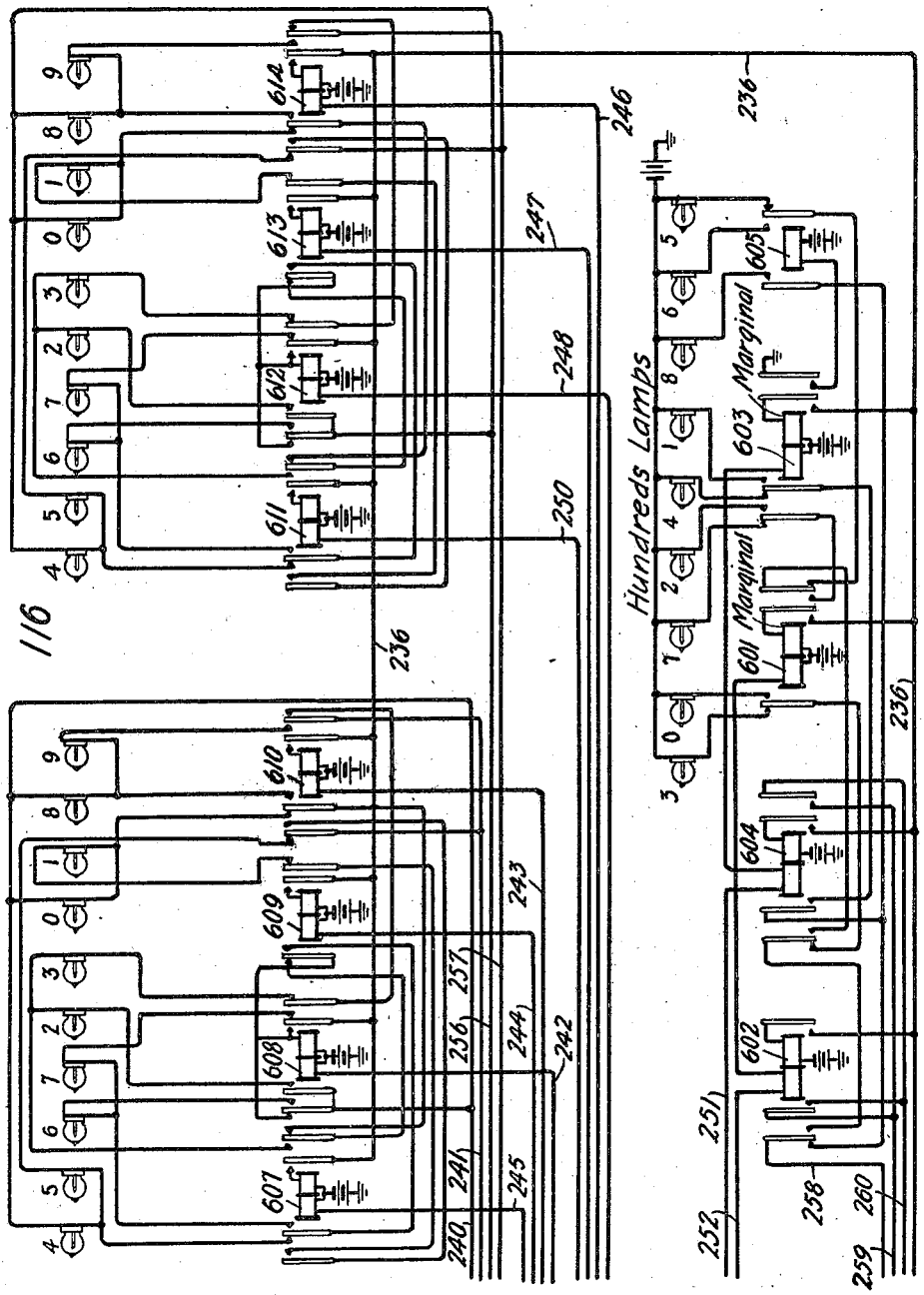

Patented June 19, 1923.

1,459,431

UNITED STATES PATENT OFFICE.

LOUIS M. ALLEN, OF NEW YORK, N. Y., ASSIGNOR TO WESTERN ELECTRIC COMPANY, INCORPORATED, OF NEW YORK, N. Y., A CORPORATION OF NEW YORK.

CONTROLLING SYSTEM.

Application filed November 25, 1919. Serial No. 340,451.

*To all whom it may concern:*

Be it known that I, LOUIS M. ALLEN, a citizen of the United States, residing at New York, in the county of New York, State of New York, have invented certain new and useful Improvements in Controlling Systems, of which the following is a full, clear, concise, and exact description.

This invention relates to a telephone exchange system in which connections are established by the aid of automatic switches, and more particularly to systems of this general type in which automatic switches are controlled by registers whose position is determined by means of an operator's key set.

It is the object of this invention to provide an arrangement whereby a set of registers at a distant point may be controlled by an operator's key set in a simple and efficient manner and by the utilization of a minimum of apparatus.

A feature of the invention is the control of a set of distant registers over a two-conductor control circuit.

The invention has been shown applied to a system of the type shown in application Serial No. 301,891 filed June 5, 1919, by A. E. Lundell and E. H. Clark. The operation of the system shown in the present application is essentially similar to that in the joint application above mentioned, excepting that in the present case the control of the registers is effected over two wires instead of over three.

It is obvious that the invention is capable of a variety of uses and may be used in systems of various types, such as, for example, any system in which registers at a distant point are to be controlled by an operator. The present application is, therefore, to be considered merely as a specific embodiment of the invention and is to be restricted only by the appended claims.

It is thought that the invention will be best understood from the following detailed description, reference being had to the accompanying drawings.

Figure 1 illustrates diagrammatically the general outline of an organization at a manual exchange in which a system embodying the various features and equipments of the present invention may be employed. Figures 2 to 7 of the drawings, taken together, illustrate such a system diagrammatically and in detail. The order in which the drawings should be arranged is shown in Figure 8.

In accordance with the present illustration of this invention, the trunks terminating at a manual exchange are divided into groups, each group of trunks leading to a particular mechanical exchange and there connecting with selectively operable switching devices, to be termed incoming selector switches. Each operator at the manual exchange is provided with a set of keys by means of which the wanted number may be registered, and an indicator for the display of the designation of the mechanical exchange and the trunk chosen for the extension of a call.

There is provided for the common use of all operators a group of connecting units for each of the groups of trunks leading to a mechanical exchange and a group of registering and controlling equipments accessible to all operators through the medium of any one of said connecting units. Each connecting unit consists of three automatic switching mechanisms. One of these mechanisms will be termed an "operator's finder switch" and is provided for the purpose of associating the key-set and indicating equipment of any operator with the connecting unit. A second mechanism that will be termed a "trunk selector" is provided for the purpose of associating the connecting unit with an idle trunk of the group leading to the desired mechanical exchange, and a third mechanism that will be termed a "sender selector" is for the purpose of associating an idle registering and controlling equipment or sender with the connecting unit. All of the senders are accessible to any one of said connecting units.

An allotting and controlling mechanism is provided for each group of connecting units. This mechanism consists of an exchange key for each mechanical exchange at each operator's position, and an allotter switch controlled by any one of the associated exchange keys to allot an idle connecting unit for the use of the operator desiring a connection to the corresponding mechanical exchange.

The manual operator in extending a call to a subscriber in a mechanical exchange makes use of the ordinary manual cord circuit in combination with one of these connecting units. The operator ascertains the wanted number from the calling subscriber and then associates the keys and the trunk indicator with an idle connecting unit of a group of trunks leading to the desired exchange. The connecting unit is also automatically connected to an idle sender. The finding of an idle trunk leading to the wanted exchange and the indicating of the number of the chosen trunk on the trunk indicator is automatically performed. The operator then proceeds, after having received a dialing tone indicating that an idle sender has been associated with the keys, to manipulate the keys and adjust the sender in accordance with the number wanted. In response to the operation of the digit keys the usual selector switches at the mechanical exchange begin to operate and associate the selected trunk with the wanted subscriber's line. During the operation of the selector switches at the mechanical office, the operator connects the outgoing end of the cord circuit associated with the calling subscriber's line, with the selected trunk, and when the selective operations at the mechanical exchange are completed, the wanted subscriber is signalled in the usual manner and the connecting unit is released and made accessible for a second call.

As the selector switches and circuits that may be used in connection with this invention are well known their operations will not be described. A suitable arrangement that may be used for this purpose is shown in Patent No. 1,403,861, issued January 17, 1922, to A. E. Lundell.

Switch mechanism, keyboard and trunk indicator.

The switches used in this invention are of the well-known step-by-step type in which a stepping pawl operates a ratchet wheel to which are connected brushes or wipers adapted to travel over the contacts of an arcuate terminal bank. These brushes or wipers are so arranged that for each step of the operating magnet, the brushes or wipers engage a corresponding set of terminals. The operator's finder switch 300 and the trunk selector switch 400 are each equipped with six brushes and corresponding terminal banks, while the sender selector 401 is equipped with five brushes and the allotter switch 121 is provided with two brushes and corresponding terminal banks. These switches have no normal positions but remain in whatever position they were placed when last used until again put into operation.

The switch 510 operates the indicator, in a manner to display the designation of the selected outgoing trunk. This switch is provided with a series of stationary brushes or wipers cooperating with a constantly rotating commutator drum having commutator segments arranged to produce the necessary combinations of impulses in the proper sequence. The commutator segments may be connected to ground or through a resistance to ground.

The keyboard consists of a single row of non-locking keys of the push-button type, and represent the digits 0 to 9. This single row of keys is used for designating the thousands, hundreds, tens and units digits of the wanted number. A separate exchange key and a wipe-out key are also of the non-locking push-button type.

The trunk indicator consists of three series of ordinary switchboard lamps arranged to indicate the hundreds, tens and units digits.

General outline of operation.

Referring now to Figure 1 a brief description of the organization of the system will be given.

Each manual operator's position 100 to 103, is provided with the usual multiple jacks 104 in which manual subscribers' lines terminate. Besides these jacks, there are a number of multiple jacks 105 in which terminate trunks arranged in groups 106, 107, etc., leading to mechanical offices, such as 110, 111, etc. Cord circuits such as 112 are provided for connecting a jack 104 with a jack 105. A keyboard is indicated at 113, and a trunk indicating device is indicated at 116.

A group of connecting units 117, 118, 119, etc., is provided for the group of trunks 106, leading to the mechanical exchange 110, and an allotter equipment 121 arranged to select an idle unit of this group may be connected to any keyboard 113 and operates under the control of the corresponding exchange key. One allotter 121 is provided for each group of exchange connecting units having access to the various mechanical offices, and a common group of senders 122 is provided for the use of all operators. The switches 123 and 124 at the mechanical exchange 110 and the circle at 125 are symbolic of the incoming and final switches and a called substation at the mechanical exchange.

The operator at position 100 receives the wanted number from the subscriber at 200 in the usual manner by connecting her telephone set with the subscriber's line through the agency of the cord 112 and jack 104. After having restored her listening key, the operator depresses an office key designating the wanted exhange. In response to the actuation of this key, the allotter 121 operates to seize the preallotted idle connecting circuit 117 and starts the operator's finder switch 300 to hunt for the operator's key-set 113 and trunk indicator 116. The operation of the allotter results also in the starting of the trunk selector switch 400 in which the connecting circuit 117 terminates, to hunt for an idle trunk leading to the wanted mechanical exchange. The sender selector switch 401 is operated to associate an idle sender 122 with the selected connecting unit 117. As soon as the connecting unit is associated with the calling operator's position and the idle sender, a dialing tone is given to the operator who then begins to set up the number wanted on the keyboard 113. The registering device forming a part of the sender 122 is adjusted in accordance with the actuation of the keyboard, and as soon as an idle trunk has been found, the selection of the wanted line at the mechanical exchange is performed under the control of the registering device. At the same time, the number of the selected outgoing trunk is indicated on the trunk indicator 116.

While the selection of the called line is proceeding, the operator inserts the calling plug of the cord circuit 112 into the jack 105 of the outgoing trunk 106, and when the selection is completed the wanted subscriber's bell is rung in the usual manner. The operator's finder switch and associated circuits and the trunk indicator lamps are restored to normal as soon as the operator connects her cord circuit to the outgoing trunk. The operator is thus enabled to set up a new outgoing connection regardless of whether the automatic selecting operations have been completed or not. The trunk selector and associated circuits of the connecting unit are restored to normal as soon as the mechanical selection is completed and revert to common use. The calling line is connected to the called line through cord 112 as soon as the automatic switches have completed their operation. When the subscribers have finished their conversation, the operator severs the connection in the usual manner by removing both plugs from their respective jacks.

*Detailed description of operation.*

Figure 1:
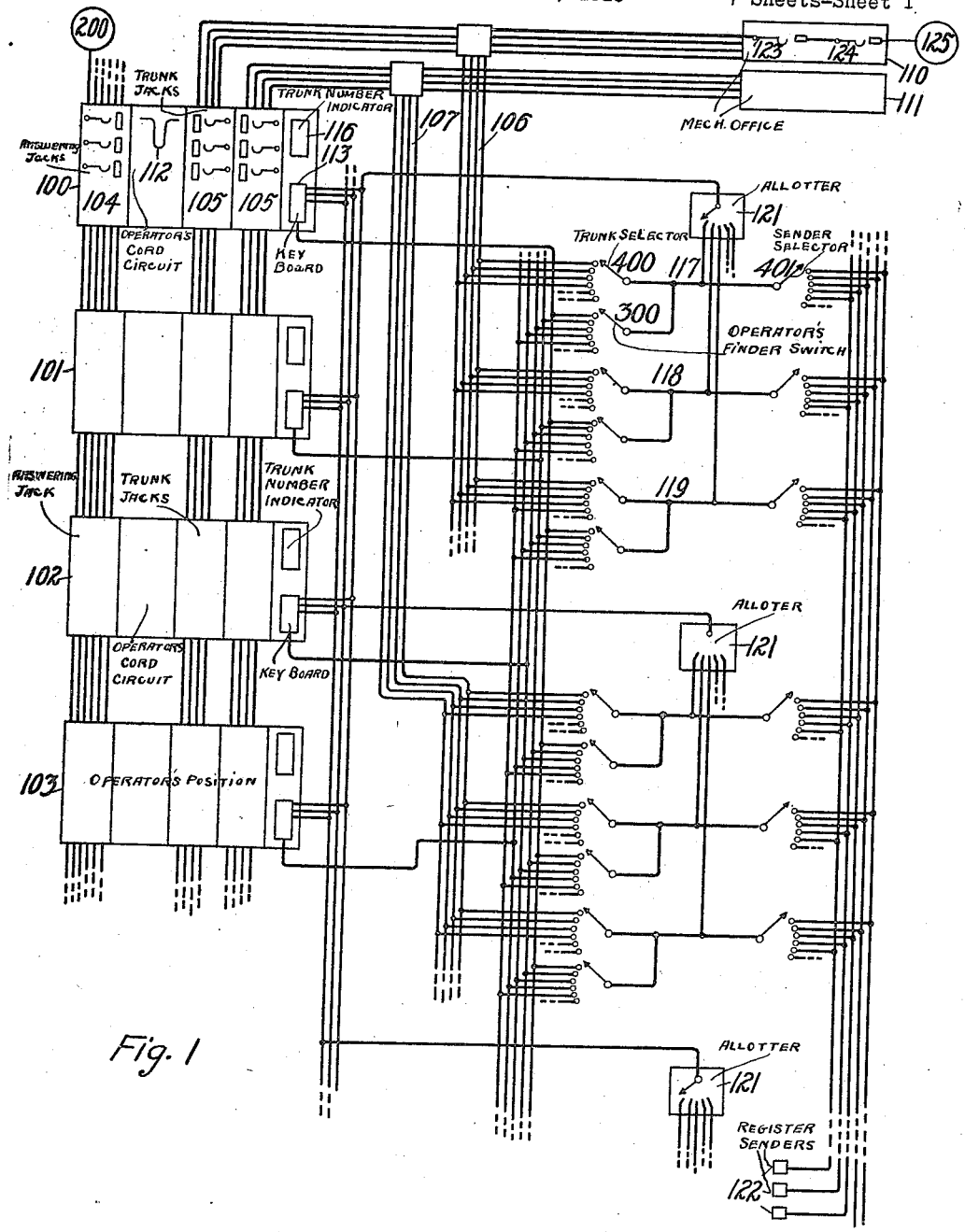

The detailed operation of the system will now be described by tracing all the operations performed during the establishment of a connection.

When the subscriber at station 200 removes his receiver from the switchhook the line relay 202 energizes and lights the lamp 203 by means of a circuit through its armature and front contact. Upon receiving this signal the operator inserts plug 205 into jack 206 closing a circuit for cut-off relay 207 to extinguish the lamp 203. The operator then manipulates listening key 209 to connect her telephone set 211 to the subscriber's line in the usual manner.

Figure 3:
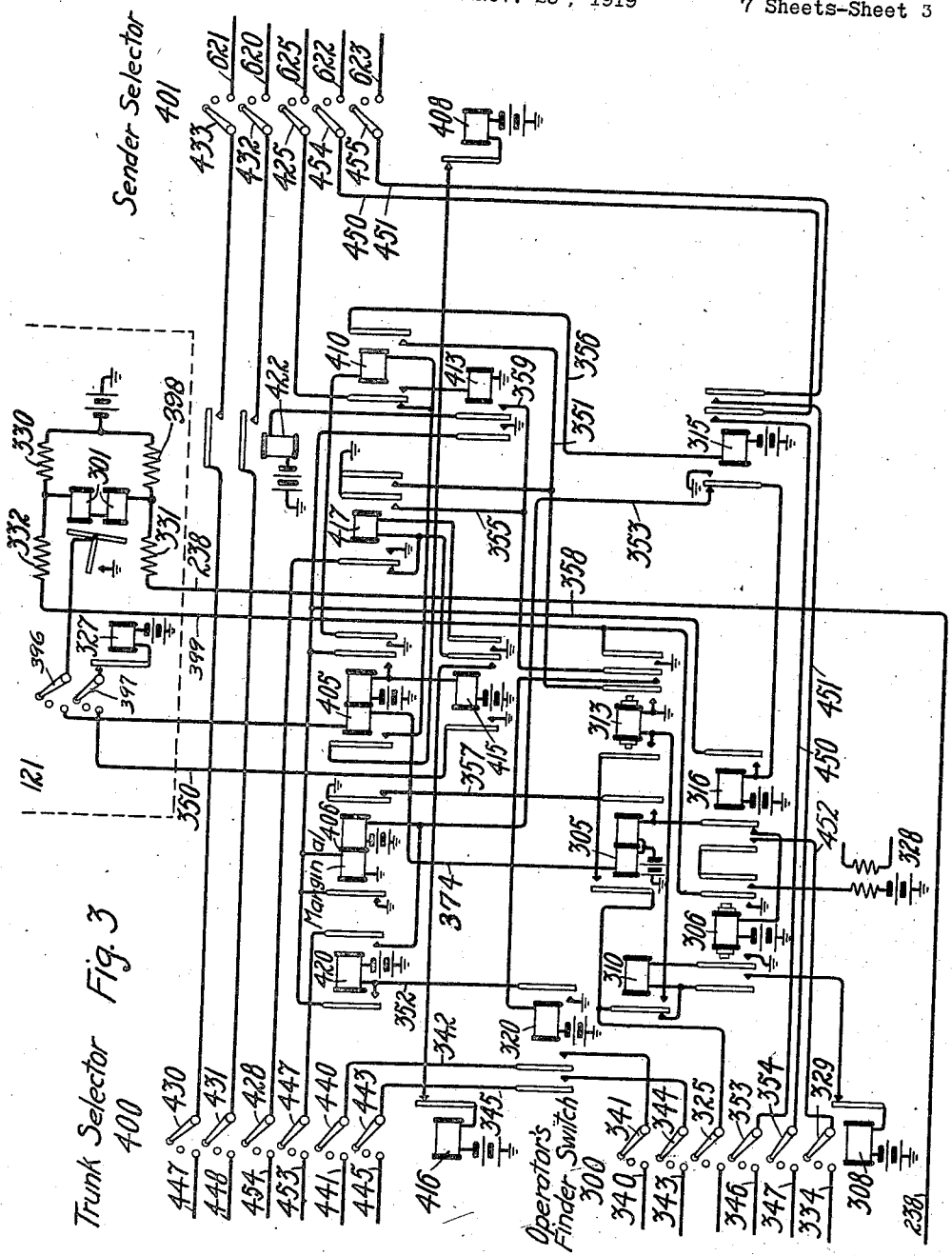

The operator, after receiving the wanted number from the subscriber at 200, depresses the exchange key 114 bearing the name of the office 110. The key 114 completes a circuit from battery, through winding of relay 207, left-hand armature and back contact of relay 210, winding 205, key 114 to ground. Relays 205 and 207 become energized and lock up through the left-hand inner front contact and armature of relay 205 and the left-hand armature and back contact of relay 206. The relay 207 prepares a circuit for the trunk-indicating lamps 116, the purpose of which will be hereinafter described. The relay 205 closes a circuit at its outer right-hand front contact and armature for the exchange lamps 208 that indicate to the operator the exchange for which the call is intended. A further circuit closed by relay 205 extends from battery, through balancing coil 330, (Fig. 3) the windings of polarized relay 301, balancing coil 331, and inner right-hand front contact and armature of relay 205 to ground.

A resistance 398 is included in parallel with the circuit of relay 301 and resistance 330, but nevertheless, sufficient current flows through relay 301 to allow it to become energized. The method of controlling relay 301 is as follws: When conductors 238 and 399 are both grounded, the windings are so balanced that no current will flow through relay 301. When ground is supplied to conductor 238 only, relay 301 is energized. The subsequent application of ground to conductor 399 will allow relay 301 to be restored. Conductors 238 and 399 are multipled to other connecting units, and the relay 301 is common to all the connecting units of an operator's position. Therefore, after a connecting unit has been taken for use it will be impossible to start a second connecting unit until the first connecting unit has arrived at a proper state of operation, since with leads 238 and 399 already grounded, the additional grounding of conductor 238 will cause no change in the electrical conditions existing in the balancing coils.

The relay 301 establishes a circuit for relays 305 and 405 as follows: battery, left-hand winding of relay 305 conductor 354, left-hand winding of relay 405, front contact and armature of relay 301 to ground. A locking circuit is provided for relay 305 as follows: battery, locking winding and right-hand front contact and armature of relay 305, lead 357, right-hand back contact and armature of relay 406 to ground. The relay 305 closes a circuit for relay 306 from battery, through the winding of relay 306, inner left-hand back contact and armature of relay 316, right-hand front contact and armature of relay 305, lead 357, right-hand back contact and armature of relay 406 to ground. The relay 306 establishes a circuit for balancing the exchange allotter 121 as follows: battery, resistance coil 330, resistance coil 332, inner right-hand front contact and armature of relay 306 to ground. The closure of this circuit causes the deenergization of relay 301 and the allotter is now partly ready for the allotting of another connecting unit as hereinafter described. The relay 306 establishes a circuit for the operating magnet 308 of the operator's finder switch 300 as follows: battery, winding, armature and back contact of magnet 308, outer left-hand armature and front contact of relay 306, back contact and armature of relay 310, brush 325 of switch 300, inner left-hand armature and back contact to ground at the relays 205 provided at other operators' positions. The magnet 308 is thereby through its self-interrupting armature and back contact, caused to step the operator's finder switch 300 forward until it finds the desired operator's position at which the relay 205 is energized.

During the operation of the operator's finder switch, a circuit is completed for relay 310 in a branch of the driving circuit of magnet 308, this circuit extending through the winding of relay 310 and the inner left-hand armature and front contact of relay 306, to ground. This relay is, however, shunted by direct ground at the back contacts of relays 205 associated with non-depressed office keys. When the test brush 325 engages a terminal at which the office key has been depressed, ground through resistance 230 will be found on this contact. The presence of resistance 230 prevents further operation of magnet 308 and is so designed as to allow relay 310 to operate. The resistance of relay 310 is also great enough to prevent further operation of magnet 308.

Relay 310 closes a circuit from battery, through the winding of relay 207, left-hand armature and back contact of relay 210, the winding, inner left-hand front contact and armature of relay 205, brush 325, armature and front contact of relay 310, and the winding of relay 313 to ground. Relay 313 locks up through a branch circuit from brush 325, left-hand front contact and armature of relay 305, left-hand armature and front contact and winding of relay 313 to ground. It will be noted that there are now two branches to ground for the balancing circuit of the allotter 121, the one through the right-hand inner front contact and armature of relay 306, and the other through the inner right-hand front contact and armature of relay 205. This balancing circuit for allotter 121 must be maintained until operating magnet 327 of the allotter 121 has been operated and the operator's exchange relay 205 has been released as will be hereinafter described.

It is to be observed that when relay 405 was energized, it completed a locking circuit for itself extending through its right-hand winding and its inner right-hand armature and front contact to ground, at the left-hand armature and back contact of relay 406. A circuit is therefore completed for relay 415 extending from grounded battery, winding of relay 415 to the inner right-hand armature and front contact of relay 405, and thence to ground as described. The energization of relay 415 causes the advance of the allotter switch which is controlled by stepping magnet 327. The circuit of magnet 327 extends from grounded battery, winding, armature and back contact of magnet 327, allotter arm 397 and its associated contact to ground, at the left-hand armature and front contact of relay 415. Magnet 327 interrupts its own circuit and causes the allotter arms 396 and 397 to be advanced in search of an idle connecting unit, busy connecting units being characterized by the presence of ground potential supplied to the test terminals engaged by arm 397, by way of the left-hand armatures and front contacts of relays corresponding to relay 415. As soon as an idle connecting unit is found the allotter switch is brought to rest. As previously mentioned, the new connecting unit cannot be put into operation until ground potential has been removed from leads 399 and 238 at the connecting unit last used.

The operator's keys and trunk indicator equipment are now connected to the connecting unit 117, relays 305 and 405 being operated.

Upon its energization, the relay 405 establishes a circuit for operating magnet 408 of the sender selector 401 as follows: battery, winding, armature and back contact of magnet 408, left-hand contact and armature of relay 405, left-hand back contact and armature of relay 410, brush 425, and terminals and leads of busy senders to ground at the left-hand front contact and armature of relay 701 or to ground through winding of relay 410. This causes the sender selector magnet 408 to step the switch 401 forward until an idle sender is found, at which time the sender selector magnet 408 is prevented from continuing its operation by the presence of battery at the outer right-hand armature and back contact of relay 701 through the high resistance winding of relay 702, lead 625 and brush 425. Relay 410 is now energized over a circuit as follows: battery, winding left-hand armature and back contact of magnet 408, left-hand contact and armature of relay 405, winding of relay 410, outer right-hand armature and front contact of relay 405 to ground. The resistance of the winding of relay 410 is such as to prevent the further operation of the sender selector magnet 408. The brushes of the sender selector switch 401 will therefore come to rest on the terminals representing the first idle sender. The relay 410 causes the operation of relay 413 over a circuit as follows: battery, right-hand armature and back contact of relay 701, high resistance winding of relay 702, lead 625, brush 425, left-hand armature and front contact of relay 410, winding of relay 413 to ground. This ground at relay 413 makes the sender busy until relay 701 operates when the busy ground is received from the left-hand front contact and armature of relay 701.

Relays 313 and 410 being energized, the following circuit is established for relay 315: battery, relay 315, lead 356, right-hand armature and front contact of relay 410, lead 351, inner right-hand front contact and armature of relay 313 to ground. The relay 315 closes a circuit from battery, through the winding of relay 316, left-hand armature and front contact of relay 315 to ground. Relay 316 becomes energized and closes a locking circuit for itself through its right-hand front contact and armature, lead 358, to ground at the left-hand back contact and armature of relay 406. The relay 316 opens the operating circuit for the relay 306 but, inasmuch as this relay 306 is slow to deenergize and relay 316 is quick in action, a circuit will be established for a short interval from dialing tone source 328, through the outer right-hand front contact and armature of relay 306, the outer left-hand front contact and armature of relay 316, brush 329, lead 334, primary conductor 452, brush 329, lead 334, primary winding of induction coil 223 to ground. This dialing tone is transmitted inductively to the operator's telephone set over a circuit as follows: ground, the tertiary winding of the induction coil of the operator's telephone set 211, outer left-hand armature and front contact of exchange relay 205, secondary winding of induction coil 223 to ground. This dialing tone indicates to the operator that an idle sender has been connected to the keys 113 and that the setting up of the wanted number on keys 113 may begin regardless of whether or not the trunk selector has found an idle trunk.

The operation of the trunk selector is accomplished under the control of a relay 415 which operates as soon as relay 405 is operated over a circuit as follows: battery, relay 415, inner right-hand front contact and armature of relay 405, back contact and left-hand armature of relay 406 to ground. The relay 415 closes a circuit for the trunk selector operating magnet 416 from battery, through the winding, armature and back contact and armature of magnet 416, inner right-hand armature and front contact of relay 415, left-hand back contact and armature of relay 417, brush 428, lead 454, to ground at the relay 502 of busy out-going trunks or to ground at the left-hand front contact and armature of relay 417 of a busy trunk selector. This circuit causes the operation of the operating magnet 416 which thereupon causes the stepping of the brushes of the trunk selector 400 until an idle trunk is found, at which time the operation of magnet 416 is discontinued. The relay 417 is now operated through a circuit as follows: battery, winding armature and back contact of magnet 416, right-hand armature and inner front contact of relay 415, relay 417, outer right-hand front contact and armature of relay 415, to ground. During the operation of the magnet 416, relay 417 was short-circuited by the ground at relays like 502. The resistance of relay 417 is such as to prevent sufficient current from flowing through the magnet 416 and thus the switch is stopped with its brushes resting on the terminals of the first idle trunk encountered and relay 417 connects a ground to brush 428 through its left-hand front contact and armature to establish a busy condition for this trunk.

The relay 417 also establishes an energizing circuit for relays 320 and 422. The circuit for relay 320 is as follows: battery, winding of relay 320, middle right-hand armature and front contact of relay 313, lead 355, inner right-hand front contact and armature of relay 417 to ground. The circuit for relay 422 is from battery, through winding of relay 422, inner left-hand armature and front contact of relay 413, leads 359 and 355, to ground at the armature of relay 417. The relay 422 connects the leads 447 and 448 of the chosen outgoing trunk through brushes 430 and 431 of the trunk selector 400, armatures and front contacts of relay 422, brushes 432 and 433 of the sender selector 401 to the fundamental circuit leads 620 and 621 of the sender 122. The relay 320 connects the operating leads 342 and 345 for the trunk indicator through brushes 341 and 344, leads 340 and 343 leading to the indicator 116. The leads 342 and 345 are connected through leads 441 and 445 to the trunk indicator operating mechanism at 510. The relay 320 closes a circuit for relay 420 from battery through the winding of relay 420, lead 352, right-hand armature and front contact of relay 320 to ground. Relay 420 establishes a locking circuit for itself through its left-hand front contact and armature, left-hand back contact and armature of relay 406 to ground. The relay 420 also establishes a circuit for relay 505; from battery through relay 406, right-hand armature and front contact of relay 420, brush 447, lead 453, the low and high resistance windings of relay 505 to ground. Due to the high resistance of relay 505, relay 406 is not operated at this time but relay 505 is operated. The relay 505 extends through its left-hand armatures and front contacts, the fundamental circuit leads 447 and 448 to the outgoing trunk leads 507 and 508.

The actuation of the indicator 116 in accordance with the number of the chosen trunk, which it is assumed is 767, will now be described.

It will be remembered that the connection through to the trunk indicator is completed as soon as the trunk selector 400 finds an idle trunk, and before the relay 420 is operated. Since the number of the idle trunk selected is 767, the lead 521 is connected directly to ground, and lead 522 is connected to ground through a resistance. If the hundreds digit of the trunk number had been some other number, a different combination of electrical potentials would have been connected to the leads 521 and 522. Due to the ground on lead 521 a circuit is closed from battery, through the winding of relay 601, winding of relay 602, lead 252, outer left-hand back contact and armature of relay 226, lead 340, brush 341, inner left-hand front contact and armature of relay 320, lead 342, brush 440, lead 441, outer upper armature and back contact of relay 509 and lead 521 to ground. Relays 601 and 602 are both energized in this circuit. Relay 601 is marginal and would not have been pulled up if the ground applied at the contacts of relay 509 had included a resistance. Relay 602 is sensitive however and will respond whenever a circuit is closed through it regardless of whether a resistance is included at contacts of relay 509 or not. At the same time a circuit is established from battery through the winding of relay 603, winding of relay 604, lead 251, inner left-hand back contact and armature of relay 226, lead 343, brush 344, outer left-hand front contact and armature of relay 320, lead 345, brush 443, lead 445, the inner upper armature and back contact of relay 509 and lead 522 to ground through the resistance included in lead 522. Relay 604 is a sensitive relay and is energized in this circuit, but since relay 603 is marginal it does not energize. The relays 601, 602 and 604 prepare a circuit for the hundreds digit lamp, but this lamp will not be lighted at this time but awaits the operation of certain relays to take place after the tens and units lamps have been selected, as will be hereinafter described. These hundreds digit relays establish locking circuits for themselves from battery, through their respective locking windings to the ground at the relay 207.

As soon as the hundreds digit relays are locked up a circuit is established for the relays 227 and 226 as follows: battery, windings of relays 227 and 226 in parallel, lead 260, inner left-hand armature and front contact of relay 604, lead 259, outer right-hand make-before-break contacts of relay 226, to brush 511 and ground at commutator segment 512. The rotary impulser switch 510 is maintained in constant rotation by means of any suitable or convenient source of power. The cylindrical surface of this switch has been developed into a plane surface in order that the relative positions of the conducting segments thereon may be more clearly seen. Brush 511 and segment 512 are the first active elements in the rotary switch 510 in regards to establishing an indication for the tens and units digits. The relay 226 causes the leads 340 and 343 to be switched over to leads 254 and 253, respectively. By this time relay 505 has operated and a circuit is established through the same brush 511 and commutator contact 512 that caused the operation of relays 227 and 226 for the operation of relay 509 as follows: from battery, through winding of relay 509, outer right-hand armature and front contact of relay 505, lower armature and back contact of relay 509, through the brush 511 and commutator segment 512 to ground. Relay 509 is energized over this circuit and a locking circuit is established for relay 509 from battery, through winding of relay 509, outer right-hand armature and front contact of relay 505, lower front contact and armature of relay 509, to ground. The relay 509 extends the leads 441 and 445 through to brushes 513 and 514, respectively of the rotary switch 510. A connection is now completed from the rotary switch 510 to the trunk indicator so that the indication of the tens and units digits of the chosen trunk may be effected at the trunk indicator by the continuous rotation of the rotary switch 510, a certain sequence of impulses being sent from the commutator segments of the drum of the rotary switch 510 through these leads to the relays 231 and 229, respectively.

When brush 513 engages segment 531, a circuit is completed for relay 231, (Fig. 6), from battery through the winding of relay 231, lead 254, and outer left-hand armature and front contact of relay 226 through the switches 300 and 400 to brush 513 and segment 531 to ground. Relay 231 is energized in this circuit. At the same time that brush 513 engages segment 531, brush 514 is brought into engagement with segment 535. A circuit is then completed for relay 229, extending from grounded battery, winding of relay 229, inner left-hand armature and front contact of relay 226, conductor 343, brush 344, outer armature and front contact of relay 320, brush 443, conductor 445, inner upper armature and front contact of relay 509, conductor 524, brush 514, segment 535 to ground. Relay 229 is energized in this circuit and switches through the impulse lead to the units lamp controlling relays. At the same time that relays 229 and 231 are energized, brush 526 engages segment 537 to energize relay 607 of the tens group and relay 611 of the units group. The circuit of relay 607 extends from grounded battery, left-hand winding of relay 607, conductor 245, outer left-hand armature and front contact of relay 231, conductor 232, brush 526, segment 537 to ground. The circuit of relay 611 extends from grounded battery, left-hand winding of relay 611, conductor 250, outer left-hand armature and front contact of relay 229, conductor 232 to ground, as described. Relays 607 and 611, upon energization, lock up to conductor 236 which is grounded at the left-hand armature and front contact of relay 207.

The impulser switch 510 continues to rotate and when the next row of contacts is brought into engagement with the brush set, brushes 513 and 514 engage contacts 532 and 536, respectively. Relays 229 and 231 are again energized. At the same time brush 527 engages segment 538 to energize relay 609 in the tens group and relay 613 in the units group. The circuit of relay 609 extends through the inner left-hand armature and front contact of relay 231 to ground through brush 527 over conductor 233. The circuit of relay 613 extends over conductor 247 and the inner left-hand armature and front contact of relay 229 to ground over the same path. Relays 609 and 613, upon energization, lock up to grounded conductor 236. The next horizontal row of contacts of switch 510 is now brought into operative relation with the brush set. Brushes 513 and 514 do not engage contacts. Therefore relays 229 and 231 are deenergized at the time that brush 528 engages segment 539 and no impulses are sent to the controlling relays of either the tens group or the units group.

When the next row of contacts is brought into engagement with the brush set, brush 513 engages segment 533 to energize relay 231, as previously described. Since brush 514 does not engage a segment, relay 229 is not energized at this time. Therefore, when brush 529 engages segment 540, an impulse will be sent to the tens controlling relays only. This impulse pulls up relay 608 over a circuit extending from grounded battery through the winding of relay 608, outer right-hand armature and front contact of relay 231, conductor 235, brush 529 and segment 540 to ground. Relay 608 is energized and locked up to grounded conductor 236.

The impulser 510 continues its rotation and when brush 530 engages segment 541, a circuit is completed from grounded battery, left-hand winding of relay 206, armature and front contact of relay 227, brush 530, and segment 541 to ground. Relay 206 is energized, and locks up through its right-hand winding and inner right-hand armature and front contact to grounded conductor 236. At the same time, a circuit is completed from grounded battery, winding of relay 228, inner right-hand armature and front contact of relay 206 to ground to energize relay 228. Relays 206 and 228, at their various armatures, control the application of ground and battery to the leads which control the lighting of the number indicating lamps.

The circuit for the No. 7 lamp in the hundreds group extends from grounded battery through lamp 7, outer left-hand armature and back contact of relay 603, outer right-hand armature and front contact of relay 601, outer left-hand armature and front contact of relay 604, outer left-hand armature and front contact of relay 602, conductor 258 to ground at the right-hand armature and front contact of relay 228. The circuit for the No. 6 lamp in the tens group extends from grounded battery, outer right-hand armature and front contact of relay 206, conductor 240, outer left-hand armature and front contact of relay 608, lamp 6, inner left-hand armature and front contact of relay 607, left-hand armature and front contact of relay 609, inner right-hand armature and front contact of relay 608 to grounded conductor 236. The circuit for the No. 7 lamp in the units group extends from grounded battery, middle left-hand armature of relay 228, conductor 256, outer left-hand armature of relay 228, conductor 256, outer left-hand armature and back contact of relay 612, left-hand armature and front contact of relay 613, inner left-hand armature and front contact of relay 611, lamp 7, inner right-hand armature and back contact of relay 612 to grounded conductor 236. As a result of these circuits, the lamps are lighted to indicate that the number of the idle outgoing trunk selected, is 767.

It is thought that from the foregoing description, the manner in which any desired number may be set upon the indicator, will be readily understood by one skilled in the art. It is obvious that, if the last two digits of the number of the trunk are the same, such as in the case of the No. 722 for instance, that the leads 523 and 524 would both be connected to the brush which represents the digit 2 which appears in this disclosure as brush 542. It is also obvious that the brushes 526, 527, 528 and 529 in addition to acting as brushes for the impulse leads to the relays, may also be used to be wired to the leads 523 and 524 without interfering with the operation of the system. The double use of these brushes accomplishes a marked saving in apparatus.

The operator locates the corresponding out-going trunk jack 767 and inserts therein the calling plug 265 of the cord circuit 112. This lights the supervisory lamp 266 over a circuit established as follows: battery, lamp 266, sleeve contacts of plug 265 and jack 267, winding of relay 520, to ground. The relay 520 establishes a circuit for relay 502 as follows: battery, winding of relay 502, inner right-hand front contact and armature of relay 505, front contact and armature of relay 520 to ground. Relay 502 energizes and establishes a locking circuit for itself through its inner right-hand front contact and armature to ground at the front contact and armature of relay 520. The operation of relay 502 causes the trunk indicator to be restored to normal.

The restoration begins with the energization of relay 406 over a circuit as follows: battery, winding of relay 406, right-hand armature and front contact of relay 420, brush 447, lead 453, the low resistance winding of relay 505, front contact and armature of relay 520 to ground. The energization of relay 406 breaks the locking circuit for relay 305 and as relay 305 deenergizes, the holding circuit for relays 207, 205 and 313 is broken. These relays are all deenergized, due to the fact that relay 206 is still energized and the original locking circuit for these relays has been broken at the left-hand armature and back contact of relay 206. The deenergization of relay 205 breaks the energizing circuit for the exchange lamps 208, and the original energizing circuit for relay 301. The deenergization of relay 207 breaks the locking circuit for the various relays of the trunk indicator and all of these relays are released. The deenergization of relay 313 breaks the circuit of relay 320.

The deenergization of relays 205 and 313 opens both of the balancing circuits for the allotter 121. It should be noted that relay 313 is slow to deenergize in comparison with relay 205 so as to prevent the energization of relay 301 a second time by the ground at relay 205 and the consequent starting of a second connecting unit. The operator may now put into use another sender and outgoing trunk provided all the digits of the wanted numbers have been registered, but regardless of whether or not the registers have completed their selection at the mechanical office. It should be remembered that the operator starts to set up the wanted number on the key-set 113 as soon as she receives the dialing tone, which takes place before or simultaneously with the operation of the trunk selector 400 and the displaying of the number of the selected trunk on the indicator 116.

Operation of the keys.

Before describing the registering of the number and the subsequent selection of the wanted number at the mechanical office, it should be understood that the various series of impulses that are to be sent from this exchange for the selection of the proper number at the semi-automatic exchange are not in accordance with the decimal system but that a certain translation scheme is employed which is similar to that shown in the aforementioned patent to A. E. Lundell, No. 1,403,861 and in Patent No. 1,345,016, issued June 29, 1920 to A. E. Lundell and F. A. Stearn. In the system described in these applications a mechanical exchange has a capacity of ten thousand subscribers' lines. The subscribers' lines are divided into five groups of two thousand each and each group of two thousand is divided into four groups of five hundred each; each five hundred group is divided into five groups of one hundred each. The impulses representing the thousands and hundreds digits bring about various selections which will extend the incoming trunk leads to a group of one hundred lines in which the tens and units selections will be made in accordance with the decimal system.

The series of impulses controlled by the thousands and hundreds keys in the wanted number 4789 used in this description, are as follows: For the thousands digit No. 4, three impulses are sent which determines in which group of two thousand a selection shall be made. The thousands and hundreds digits jointly control the sending of two impulses to control the selection of the proper group of 500 lines. The hundreds digit No. 7 will then control the sending of three impulses to determine in which of five groups of one hundred each selection is to be made. In a ten thousand line exchange, the thousands impulses are from 1 to 5 to select a group of two thousand out of a total of five groups, the hundreds impulses are from 1 to 4 to select a group of five hundred out of a total of 4 groups in a two thousand line group, followed by 1 to 5 impulses to select a group of one hundred out of a total of five groups in a five hundred line group.

Figure 2:
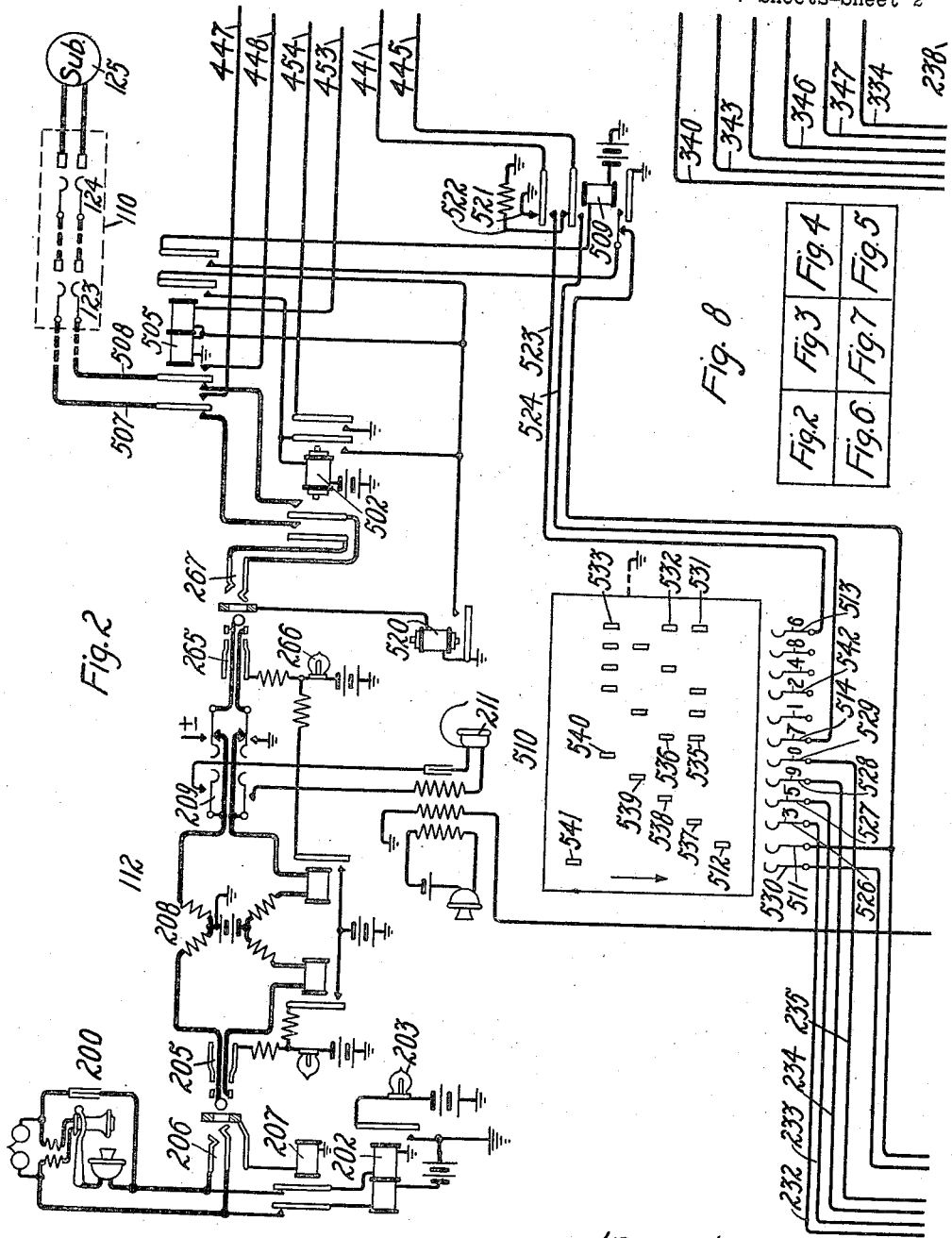

The setting up of the wanted number on the operator's key set 113, will now be described: It is to be noted that the key set 113 comprises a set of 10 keys, one for each of the numbers from 0 to 9, and that these keys may be used in succession to control the registration of the various digits of the number of the wanted line. In case two of the digits of the wanted number are the same, the key in the key set corresponding to that number, will have to be used twice. It is to be observed that the entire set of registers shown in Fig. 4 is controlled from the keys over two controlling wires which are conductors 346 and 347 of Figs. 6 and 2, and which appear in Fig. 3 as conductors 450 and 451, and which appear in Fig. 4 as conductors 622 and 623.

It will be remembered that at the time the connecting unit 117 found an idle sender, a dialing tone was transmitted to the operator indicating that the setting up of the number of the wanted subscriber may take place. It should also be noted that this setting up of the number may begin before the connecting unit 117 has found the idle outgoing trunk. Thus the registration of the number may take place simultaneously with the operations necessary to find and indicate an outgoing trunk.

It has been assumed that a subscriber's line, having the number 4789, is to be selected. As soon as an idle sender was associated with the connecting unit, a control circuit was completed from the operator's keyboard 113 to the register and control equipment. This controlling circuit comprises two leads which extend from the keys to the thousands register relays 802, 803, 804 and 805.

The automatic switch shown in Fig. 4 is of a type shown in application Serial No. 317,126 filed August 13, 1919, by O. F. Forsberg and DeVignier. The switch is normally equipped with six brush sets which are arranged to travel over and make contact with corresponding arcuate contact banks under the control of a motor magnet 150. In the present disclosure only four of the brushes are shown and are indicated in relation to their corresponding arcs of terminals at 151, 152, 153 and 154. The switch is arranged for motion in a clockwise direction only. The normal position of the switch is that shown in the drawing.

Upon the depression of key #4 for the thousands digit a circuit is established from grounded battery through the winding of relay 802, conductor 720, brush 152, and its first contact, winding of relay 715, conductor 622, sender selector brush 454, conductor 450, inner right-hand armature and front contact of relay 315, conductor 450, brush 353, conductor 346, closed left-hand contact of key #4, resistance 260 to ground. Due to the fact that the resistance 260 is in the circuit of the marginal relay 802, it does not operate, but there is sufficient current passing through this circuit to operate relay 715. Relay 715 establishes a circuit for counting relay 705 as follows: battery, winding of relay 705, inner left-hand back contact and armature of relay 704, outer armature and front contact of relay 715 to ground, and locks up to ground at the left-hand contact of relay 701 over a circuit extending through relay 704 and the right-hand armature and front contact of relay 705. Relay 704 being shunted by ground at the outer armature and front contact of relay 715 does not energize at the time. At the same time that the circuit through relays 802 and 715 is completed, a circuit is completed simultaneously from grounded battery, left-hand winding of relay 804, left-hand winding of relay 803, conductor 721, brush 153 and its first contact, conductor 623, brush 455, conductor 451, outer right-hand armature and front contact of relay 315, conductor 451, brush 354, conductor 347, right-hand contact of key #4 to ground. Since the right-hand contact of key #4 is connected directly to ground, relays 803 and 804 are both energized, in spite of the fact that relay 804 is marginal. Relays 804 and 803, upon energization lock themselves to conductor 736, which is connected to ground at the left-hand armature and back contact of relay 701.

It is to be observed that the energization of relay 715 completes a circuit from grounded battery, winding of stepping magnet 150, inner right-hand armature and front contact of relay 715 to ground. Magnet 150 is energized and attracts its armature, but due to the fact that the switch is arranged to advance its brushes upon release of the magnet, the switch is not advanced. As soon as key #4 is released, relay 715 deenergizes causing in turn the deenergization of magnet 150 which advances the switch brushes into engagement with their second contacts, respectively. The deenergization of relay 715, removes the shunt path about the winding of relay 704, and relay 704 becomes energized and is locked up in series with relay 705 over the locking circuit previously traced.

In position 2 of the progression switch, a circuit is completed from grounded battery, winding of relay 155, brush 154 and its second contact to ground. Relay 155 is energized and completes a circuit from grounded battery, winding of magnet 150, armature and back contact of magnet 150, armature and front contact of relay 155, to ground. Magnet 150 is energized and interrupts its own circuit to advance the switch into position 3. The controlling leads 622 and 623 are now advanced to the leads controlling the hundreds register relays.

The depression of the hundred digit key #7, causes a circuit to be established from #7, grounded battery through the left-hand winding of relay 806, conductor 723, brush winding of relay 152, and its third contact, winding of relay 715, conductor 622, thence over the path previously described to conductor 346, through the left-hand contact of key #7, and the low resistance right-hand winding of relay 221 to ground. Relays 806 and 221 are energized in this circuit and due to the energization of relay 221, a circuit is established from grounded batery through the winding of slow release relay 156, left-hand armature and front contact of relay 221 to ground.

Relay 806 although marginal was allowed to energize in the previously traced circuit, due to the fact that the low resistance winding of relay 221 was included in this circuit. Relay 715 was also energized in the circuit above traced and causes the energization of counting relay 707 and also causes the energization of motor magnet 150. No circuit is found for relays 807 and 808 at this time, since conductor 347 has no connection extending to the right-hand contact of the #7 key. As soon as key #7 is released, relay 715 is deenergized causing the progression switch to be advanced into position 4. The release of key #7 also allows relay 221 to be deenergized, but due to the fact that relay 156 is slow to release, a sufficient time interval is provided to complete a circuit for relay 809, extending from grounded battery, left-hand winding of relay 809, conductor 725, brush 153 and its fourth contact, conductor 623, thence to conductor 347, armature and front contact of slow release relay 156, right-hand armature and back contact of relay 221, conductor 346, conductor 622, brush 151 and its fourth contact, brush 152 and its fourth contact to ground. Magnet 809 is energized and locks up through its right-hand winding to grounded conductor 736. Relay 715 is shunted in the path just described and cannot energize. It is obvious that the relay 809 must energize during the time that relay 155 is being energized in position 4 of brush 154 which in turn causes the completion of the self-interrupting circuit of magnet 150 to cause the advance of the progression switch. It is obvious however that there is ample time for relay 809 to energize, since before the progression switch moves out of position 4 and into position 5, relay 155 must be energized and magnet 150 must then be energized and again deenergized. It is to be noted that when the #7 key was released and caused the deenergization of relay 715, counting relay 706 was energized in series with counting relay 707, and these two relays locked up to ground through the right-hand armature and front contact of relay 707.

As just previously mentioned, the progression switch is advanced into position 5 under the control of relay 155 in the usual manner for advance out of even positions.

When the tens digit key #8 is depressed a circuit is established for relay 810 in the group of register relays which control tens selection. This circuit extends from grounded battery, left-hand winding of relay 810, conductor 727, brush 152 and its fifth contact, winding of relay 715, and thence by way of conductors 622 and 346, the left-hand closed contact of key #8 and the right-hand low resistance winding of relay 221 to ground. Since the low resistance winding of relay 221 is included in this circuit, marginal relay 810 is energized. Relay 715 is energized in the circuit above described. Simultaneously a circuit is completed from grounded battery, left-hand winding of relay 812, left-hand winding of relay 811, conductor 728, brush 153 and its fifth contact, conductors 622 and 347, closed right-hand contact of key #8, and right-hand low resistance winding of relay 221 to ground. Relays 812, 811 and 221 are energized in this circuit. Either of the circuits just described operates to energize relay 221, causing in turn, the energization of relay 156. Relays 810, 811 and 812 upon energization lock up to grounded conductor 736. Relay 715 upon energization, causes the energization of motor magnet 150 and as soon as key #8 is released, relay 715 deenergizes, causing in turn the deenergization of magnet 150 which advances the brush set in engagement with the sixth set of terminals. Due to the fact that relay 156 is slow to release and will remain energized after relays 221 and 715 are deenergized, a circuit is completed from grounded battery, left-hand winding of relay 813, conductor 729, brush 153 and its sixth contact, conductors 623 and 347, armature and front contact of relay 156, right-hand armature and back contact of relay 221, conductors 346 and 622, brush 151 and its sixth contact, brush 152 and its sixth contact to ground. Relay 813 is energized, and locks up through its right-hand winding. As soon as brush 154 reaches its sixth terminal, relay 155 is energized to cause the advance of the progression switch into position 7 in the manner previously described. It is to be noted that the energization and deenergization of relay 715 causes counting relays 708 and 709 to be energized and locked up in a manner similar to that previously described in connection with the counting relays 704, 705, 706 and 707.

In position 7 of the progression switch, circuits are prepared for the setting up of the registration on the units selection controlling relays.

In response to the depression of the units digit key #9, a circuit is completed from grounded battery, left-hand winding of relay 814, conductor 731, brush 152 and its position 7 contact, through relay 715, conductors 622 and 346, left-hand contact of key #9, left-hand high resistance winding of 221 to ground. Relay 221 is energized and causes the energization of relay 156. Relay 715 is energized, but relay 814, due to the high resistance of the left-hand winding of relay 221, does not become energized at this time. A circuit is simultaneously established from grounded battery, left-hand winding of relay 816, left-hand winding of relay 815, conductor 732, brush 153 and its seventh contact, conductors 623 and 347, right-hand contacts of key #9, right-hand low resistance winding of relay 221 to ground. Relays 815 and 816 are energized and lock up through their right-hand windings to grounded conductor 736. As soon as key #9 is released relays 715 and 221 are deenergized, and the progression switch is moved into position 8, but before slow relay 156 can retract its armature, a circuit is completed from the grounded battery, left-hand winding of relay 818, conductor 733, brush 153 and its eighth contact, conductors 623 and 347, armature and front contact of relay 156, right-hand armature and back contact of relay 221, conductors 346 and 622, brush 151 and its eighth contact, brush 152 and its eighth contact, to ground. Relay 818 energizes in this circuit and locks up through its right-hand winding. The energization and deenergization of relay 715 causes the energization and locking up of counting relays 710 and 711 in a manner similar to that previously described.

With the progression switch in position 8, the circuit of relay 155 is completed and maintained until the progression switch has advanced into its normal position, to which it will immediately return, due to the fact that with relay 155 energized, the previously described self-interrupting circuit of magnet 150 is effective. The progression switch upon arriving in its normal position awaits re-use in connection with another call. The progression switch has been shown as having more than eight positions, although only eight positions are required in connection with the operation of the system. This showing has been made in view of the fact that small step-by-step switches are usually made to be of either ten or twenty points capacity. The restoring circuit just described will of course, cause the restoration of the switch to normal, regardless of how many contacts it was originally designed to serve.

All the register relays necessary for the control of the impulses representing the number 4789 are now locked up and the selection at the mechanical office may take place.

The selection at the mechanical office will begin as soon as the outgoing trunk has been found and the thousands key is released, since the fundamental circuit from trunk leads 507 and 508 is then extended through to the counting relays as follows: from lead 507, through outer left-hand armature and front contact of relay 505, lead 447, brush 430, upper armature and front contact of relay 422, brush 433, lead 621, outer left-hand armature and front contact of relay 704, lead 621, left-hand armature and back contact of relay 920, windings of stepping relay 916, left-hand armature and back contact of relay 900, back contact and armature of relay 915, lead 620, brush 432, inner front contact and armature of relay 422, brush 431, lead 448, inner left-hand front contact and armature of relay 505, trunk lead 508. These trunk leads are to be extended to the called station 125 through incoming switch 123 and final switch 124. Under the control of the commutator associated with the incoming selector, the stepping relay 916 operates three times. In response to the first energization of relay 916 a circuit is established as follows: from battery, through the inner right-hand armature and back contact of relay 917, back contact and armature of counting relay 0', winding of counting relay 4, back contact and armature of relay 4', back contact and armature of relay 923, front contact and armature of relay 916, to ground. This operates counting relay 4. Counting relay 4' is shunted at the front contact of relay 916. Upon the first deenergization of relay 916 counting relay 4' is permitted to energize and is locked up in series with counting relay 4.

Counting relay 3 energizes as soon as relay 916 is energized a second time, and when it is deenergized, relays 3 and 3' are locked up.

Figure 5:
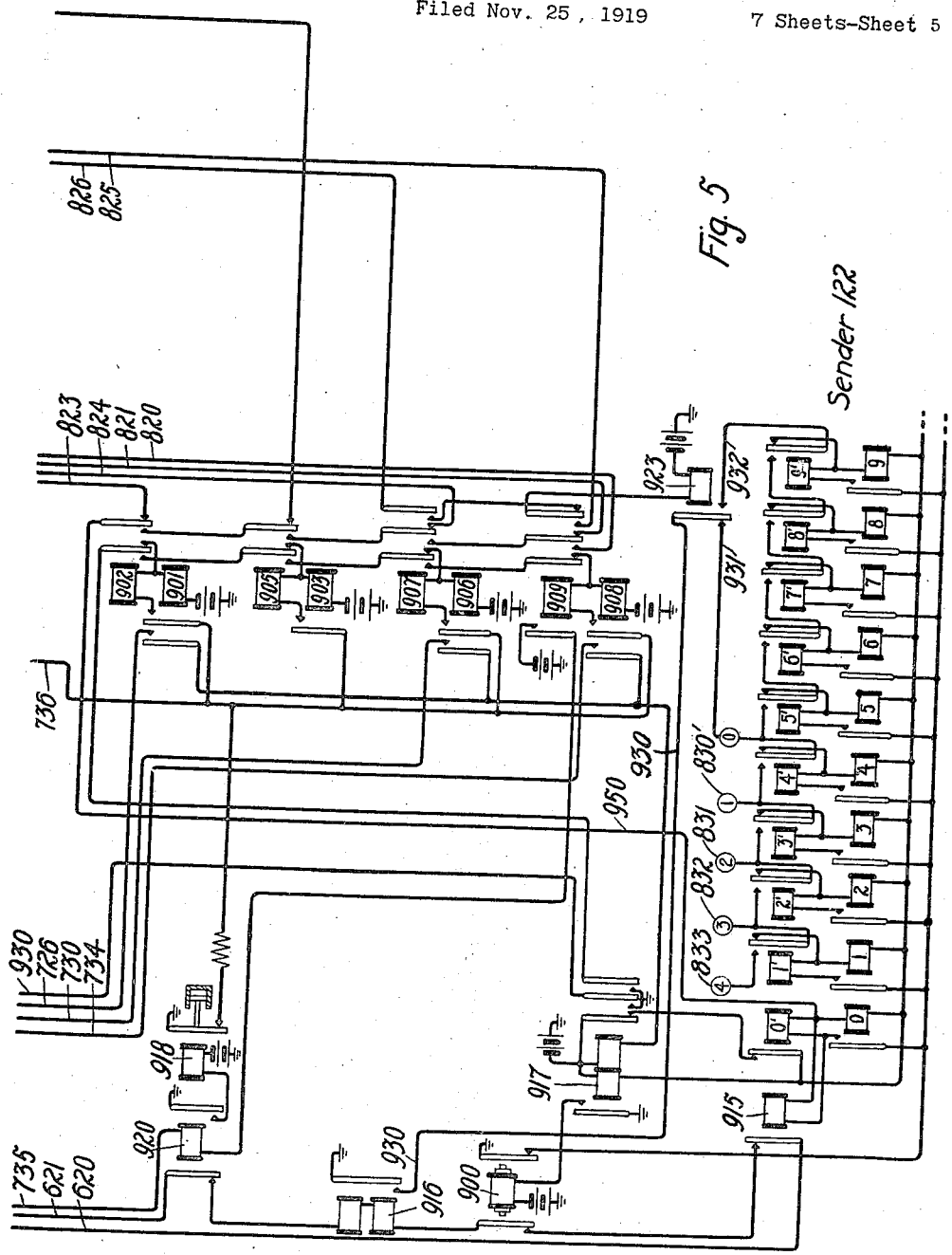

Upon the third energization of relay 916, a circuit is completed from grounded battery, inner right-hand armature and back contact 917, armature and back contact of the 0' counting relay, through the winding of the 0 counting relay, conductor 950, outer armature and back contact of relay 902, conductor 823, left-hand armature and back contact of relay 805, outer left-hand armature and back contact of relay 801, outer right-hand armature and back contact of relay 802, outer right-hand armature and front contact of relay 803 to conductor 831, thence to conductor 831 in Fig. 5 through the armatures and front contacts of counting relays 3' and 4', thence by way of conductor 931, to ground at the armature and front contact of relay 916. This circuit operates counting relay 0 and upon the subsequent deenergization of relay 916, counting relay 0' and relay 915 become energized. When relays 0' and 915 operate, the originally traced locking circuit including the back contact and armature of relay 0' is broken, but the counting relays are maintained locked up through the left-hand winding of relay 917, to battery. The relay 917 becomes energized and a circuit is established for relay 900 as follows: battery, winding of relay 900, left-hand front contact and armature of relay 917, to ground. The relay 900 breaks the locking circuit for all the counting relays including relay 915. It will be noted that relay 915 had previously opened the fundamental circuit at its left-hand back contact and armature and that relay 900 maintained the fundamental circuit open while relay 915 deenergized. This breaking of the fundamental circuit causes the incoming selector to trip a brush that has access to the desired group of two thousand lines. The relay 917 establishes a circuit for relay 901 as follows: battery, winding of relay 901, inner back contact and armature of relay 902, outer right-hand front contact and armature of relay 917, to ground. This energizes relay 901.

Relay 901 closes a circuit for the relay 917 as follows: battery, right-hand winding of relay 917, outer left-hand armature and front contact of relay 901, conductor 726, right-hand back contact and armature of relay 706, to ground. However, this holding circuit for relay 917 will be effective only if the hundreds digit key has not been depressed, in which case the counting relays will wait until the depression of the hundreds digit key takes place. This is to insure that the mechanical selection shall wait for the setting up of the number. There is a circuit like the above established for relay 917 between successive digits by the counting relays 901, 906 and 908 and the right-hand back contacts and armatures of relays 706, 708 and 710 in succession but no further reference will be made to these circuits, as it will be assumed that the setting up of the number and locking up of the relays has taken place before the starting of the mechanical selection.

If, as in the present case, the hundreds key has been depressed, the relay 706 is energized, and the above traced circuit including the right-hand winding of relay 917 is not established. The relay 917 becomes thus deenergized upon the energization of slow acting relay 900 and opens the circuit of the latter. When relay 917 deenergizes, the shunt is removed from the winding of relay 902, and this relay energizes. The fundamental circuit is now again closed, and the incoming switch at the mechanical office is again started. Under the control of the incoming selector the relay 916 is operated and a circuit is established as follows: battery, inner right-hand armature and back contact of relay 917, back contact and armature of counting relay 0', winding of counting relay 4, back contact and armature of counting relay 4', back contact and armature of relay 923, front contact and armature of relay 916, to ground. Upon the first deenergization of relay 916, the counting relays 4' and 4 are locked up. This extends the circuit through to lead 830' and at the next energization of the relay 916, a circuit is established from battery, through the right-hand armature and back contact of relay 917, back contact and armature of 0' relay, winding of counting relay 0, conductor 950, outer right-hand armature and front contact of relay 902, outer right-hand armature and back contact of relay 905, right-hand armature and back contact of relay 801, right-hand outer armature and front contact of relay 809, lead 830', the front contact and armature of counting relay 4', back contact and armature of relay 923, front contact and armature of relay 916, to ground. Counting relay 0 is energized in this circuit and upon the subsequent deenergization of relay 916, counting relay 0' and relay 915 are energized as previously described. This causes the energization of relay 917 which in turn energizes relay 900 and the fundamental circuit is again broken as in the previous case. The relay 917 in this case establishes a circuit for relay 903 as follows: battery, winding of relay 903, inner armature and back contact of relay 905, inner right-hand front contact and armature of relay 902, outer right-hand armature and contact of relay 917, to ground. Relay 900 not only breaks the locking circuit for the counting relays, but also the circuit for relay 917. The deenergization of relay 917 causes the reestablishment of the fundamental circuit and a second series of impulses, due to the depression of the hundreds key will be transmitted. It will be noted that the deenergization of relay 917 causes the operation of relay 905 and the locking up of relays 903 and 905 over a circuit as follows: battery, winding of relay 903 and winding of relay 905 in series, front contact and armature of relay 903, to ground at the relay 701. The third series of groundings of the fundamental circuit at the mechanical office begins after the original closing of the fundamental circuit, when relay 916 operates, and a circuit is established to energize counting relay 4, and due to the continued interruptions of the fundamental circuit at the mechanical office, the relay 916 is energized and deenergized in the same manner as before until the counting relays 4 and 4' and 3 and 3' are locked up. The next energization of relay 916 establishes a circuit for the 0 counting relay as follows: battery, inner right-hand armature and back contact of relay 917, contacts of counting relay 0', winding of counting relay 0, conductor 950 outer right-hand armatures and front contacts of relays 902 and 905, middle armature and back contact of relay 907, lead 824, left-hand armature and back contact of relay 807, outer right-hand armature and front contact of relay 806, lead 831, front contacts and armatures of relays 3' and 4' in series, back contacts and armature of relay 923, front contact and armature of relay 916, to ground. The operation of relays 0' and 915, 917 and 900 takes place in sequence as previously stated, and the locking circuit for the counting relays is broken as before. Upon the energization of relay 917, relay 906 is energized by a circuit from battery, through relay 906, left-hand back contact and armature of relay 907, inner left-hand front contacts and armatures of relay 905 and 902 in series, outer right-hand front contact and armature of relay 917, to ground. Upon the subsequent deenergization of relay 917, relays 906 and 907 lock up.

It will be noted that upon the energization of relay 813, a circuit was partly completed for relay 923 and upon the locking up of relay 907, this circuit is completed as follows: battery, winding of relay 923, outer right-hand armature and back contact of relay 909, outer right-hand front contact and armature of relay 907, lead 826, left-hand front contact and armature of relay 813, to ground. This energizes relay 923 and switches the lead 930 from lead 931 to 932. When, therefore, the fundamental circuit is closed as in previous cases, a circuit is established for counting relay #9 at the first energization of relay 916. The fundamental circuit is now shunted by the commutator at the final selector switch in the mechanical office a number of times and for each shunting a set of counting relays is energized and locked up until the sets 9 and 9′ to 2 and 2′, inclusive, have been energized and locked up. At this time a circuit is established for the 0 counting relay as follows: battery, inner right-hand armature and back contact of relay 917, back contact and armature of the 0′ relay, winding of the 0 counting relay, outer right-hand armature and front contact of relays 902 and 905 and middle armature and front contact of relay 907, middle armature and back contact of relay 909, lead 821, left-hand armature and front contact of relay 811, left-hand armature and front contact of relay 810, outer left-hand armature and front contact of relay 812, lead 832, right-hand armatures and front contacts of counting relays 2′ to 9′, inclusive, in series, front contact and armature of relay 923, front contact and armature of relay 916, to ground. The subsequent deenergization of stepping relay 916 causes the operation of counting relay 0′ and relay 915. The operation of counting relay 0′ causes the energization of relay 917, and the energization of relay 917 causes the energization of relay 900, and the locking circuits for the counting relays are thereby broken and the fundamental circuit is opened, as previously described.

The relay 917 establishes a circuit for relay 908 as follows: battery, winding of relay 908, inner right-hand back contact and armature of relay 909, inner left-hand front contacts and armatures of relays 907, 905 and 902 in series, outer right-hand front contact and armature of relay 917, to ground. The energization of relay 908 establishes a holding circuit for relay 917 as follows: battery, winding of relay 917, outer left-hand armature and front contact of relay 908, lead 734, right-hand back contact and armature of relay 710, to ground. The operation of relay 710 breaks the holding circuit for relay 917. The deenergization of relay 917 permits relay 909 to be energized and locked up in series with relay 908 as follows: battery, winding of relay 908 and 909 in series, inner left-hand front contact and armature of relay 908, to ground at relay 701. The energization of relay 909 causes the release of relay 923, but the circuit for relay 923 is again established as follows: battery, winding of relay 923, outer right-hand armature and front contact of relay 909, lead 825, left-hand contact and armature of relay 818, to ground.

Due to the re-establishment of the circuit for relay 923, the lead 930 remains in connection with lead 932. Therefore, when the fundamental circuit is again established and on the first energization of relay 916, a circuit is established for counting relay 9 and upon each make and break each of the fundamental circuit a set of counting relays is locked up beginning with 9 and 9′ and ending with 1 and 1′. When counting relay 1′ has been energized a circuit is established as follows: battery, inner right-hand armature and back contact of relay 917, armature and back contact of relay 0′, winding of 0 counting relay, the outer left-hand armatures and front contacts of relays 902, 905 and middle armatures and front contacts of relays 907 and 909 in series, lead 820, left-hand armature and front contact of relay 815, left-hand armature and back contact of relay 814, outer right-hand armature and front contact of relay 816, lead 833, right-hand armatures and front contacts of counting relays 1′ and 9′ inclusive, lead 932, armature and front contact of relay 923, lead 930, front contact and armature of relay 916, to ground. The subsequent deenergization of stepping relay 916 causes the energization of relays 917 and 900 as previously described, and the fundamental circuit is finally broken.

All the impulses necessary to advance the switches at the mechanical office have now been sent and there is no further use for the register controlling equipment.

*Release of the operator's equipment.*

The release of the operator's equipment and its return to common use will now be described.

It will be remembered that as soon as the operator inserted her calling plug in the outgoing trunk jack 267, the trunk indicator was returned to normal. Therefore, as soon as the mechanical selection has been completed, the register controlling equipment will be returned for common use and the connecting unit 117 will also be returned for common use and the connection from the operator's cord circuit will be connected through to the outgoing trunk and through the switches at the mechanical office to the called line. The ringing of the called station will then take place.

It is to be noted that upon the operation of relay 909 a circuit is closed that prepares the register controlling equipment for release as soon as the units impulses have been sent. This circuit is as follows: ground, winding of relay 701, lead 735, winding of relay 920, left-hand armature and front contact of relay 909, to grounded battery. Relay 920 is energized and establishes a circuit for relay 918 as follows: battery, winding of relay 918, right-hand front contact and armature of relay 920. Relay 918 being slow to operate its armature will maintain a substitute holding circuit to ground for the register relays for a sufficient length of time to permit the final units impulses to be transmitted, since at the time of the operation of the relay 909, relay 701 was energized and removed the original holding ground for the locking circuit for the register relays.

When the ground for the register relays is removed at the right-hand armature and back contact of the slow-acting relay 918, all the register relays and counting relays are released and as soon as relay 909 is released relay 920 is released and consequently also relay 918.

The operation of relay 701 removes at its right-hand back contact and armature the energizing battery for relay 413. The removal of the battery from relay 413 causes this relay to deenergize and the deenergization of relay 413 removes the holding ground for the relays 405, 420 and 316.

The deenergization of relay 405 causes the deenergization of relay 415 and relay 410 and also breaks the original operating circuit for the sender selector operating magnet. The deenergization of relay 415 breaks the energizing circuit for relay 417 and the operating circuit for trunk selecting magnet 416, and the deenergization of relay 415 also removes the ground from the lead 350 that was connected to the allotter 121 and thus removes the busy condition from the connecting unit. This connecting unit can therefore be seized by the allotter.

It will be noted in passing that the energizing circuit for relay 422 that was maintained through the contacts of relays 417 and 413, was already broken upon the deenergization of relay 413. Upon the deenergization of relay 420, the energizing circuit for relay 406 is broken. Simultaneously with the breaking of the circuit of relay 320, the energizing circuit for relay 315 was broken at the contact of relay 410.

The deenergization of relay 315 breaks the energizing circuit for relay 316 and disconnects the leads 450 and 451 from the brushes 353 and 354 respectively, of the operator's finder. Relay 701 is deenergized as soon as relay 909 retracts its armatures.

All of the apparatus has now been restored to its normal condition and is ready for re-use.

What is claimed is:

1. In a telephone exchange system, a plurality of registering devices, a key set, a two-conductor control line extending from said key set to said registering devices, and means to adjust said registering devices by means of electrical impulses of varying characteristics over said control line, each of said registering devices being under the control of any key in said key set.

2. In a telephone exchange system, a plurality of registering devices, a key set, a two-conductor control line extending from said key set to said registering devices, progression controlling apparatus, means to operate said progression controlling apparatus to successively associate said registering devices with said key set, and means to adjust said registering devices by means of electrical impulses over said control line, each of said registering devices being under the control of any key in said key set.

3. In a telephone exchange system, a plurality of registering devices each comprising a set of adjustable members, a key set, a two-conductor control line extending from said key set to said registering devices, a progression controlling apparatus, means to operate said progression controlling apparatus to successively associate said registering devices with said key set, means to adjust each of said registering devices under the control of any key in said key set, said adjusting means comprising means to selectively operate certain ones of the adjustable members of a registering device in a certain position of said progression controlling apparatus, and means to operate others of said adjustable members in a certain other position of said progression controlling apparatus.

4. In a telephone exchange system, a plurality of registering devices, each of said registering devices comprising a set of relays, a key set, a progression controlling apparatus, means to operate said progression controlling apparatus to successively associate said registering devices with said key set, and means to adjust each of said registering devices in successive stages under the control of any key in said key set.

5. In a telephone exchange system, a plurality of registering devices, each of said registering devices comprising a set of relays, a key set, a progression controlling apparatus, means to operate said progression controlling apparatus under the control of said key set to successively associate said registering devices with said key set, and means to adjust each of said registering devices in successive stages under the control of any key in said key set.

6. In a telephone exchange system, a plurality of registering devices, a key set comprising a plurality of non-locking keys, there being one key for each of the ordinal numbers, 0 to 9, a two-conductor control line extending from said key set to said registering devices and means to adjust said registering devices in accordance with the various digits of a number, comprising as many digits as there are registering devices, under the control of said key set by means of electrical impulses of varying characteristics over said control line.

7. In a telephone exchange system, a plurality of registering devices, a key set, a multiposition controlling apparatus, means to advance said controlling apparatus through a group of positions each time a key in said key set is released, and means to accomplish partial adjustment of a registering device in each position of said controlling apparatus.

8. In a telephone exchange system a plurality of registering devices, a key set, a multiposition controlling apparatus, means to advance said controlling apparatus through a group of positions each time a key in said key set is released, means to accomplish a partial adjustment of one of said registering devices in the first position of a group under the direct control of a depressed key in said key set, electromagnetic devices associated with said key set and controlled thereby, means to set up a registration on said electromagnetic devices under the control of a depressed key, means to render said last named registration effective after the release of the key for a period of time in excess of that required for said controlling apparatus to advance through a group of positions, and means to accomplish successive partial registrations in positions of said controlling apparatus other than the first position of a group under the control of said electromagnetic devices.

9. In a telephone exchange system, a plurality of registering devices each comprising a set of adjustable members, a key set, a progression controlling apparatus, means to operate said progression controlling apparatus under the control of said key set to successively associate said registering devices with said key set, means to complete simultaneous circuits to cause the operation of certain ones of the adjustable members of one of said registering devices in response to the actuated condition of one of the keys of said key set, means effective upon the release of the actuated key to cause the advance of said progression controlling apparatus to a new position, and means thereupon effective to complete a circuit to cause the operation of other adjustable members of said registering device in accordance with a temporary condition originally controlled by the actuation of said key.

In witness whereof, I hereunto subscribe my name this 20th day of November A. D., 1919.

LOUIS M. ALLEN.